March 23, 1965   J. R. GROSS   3,174,353
SPEED REDUCING GEAR
Filed Feb. 23, 1961   2 Sheets-Sheet 1
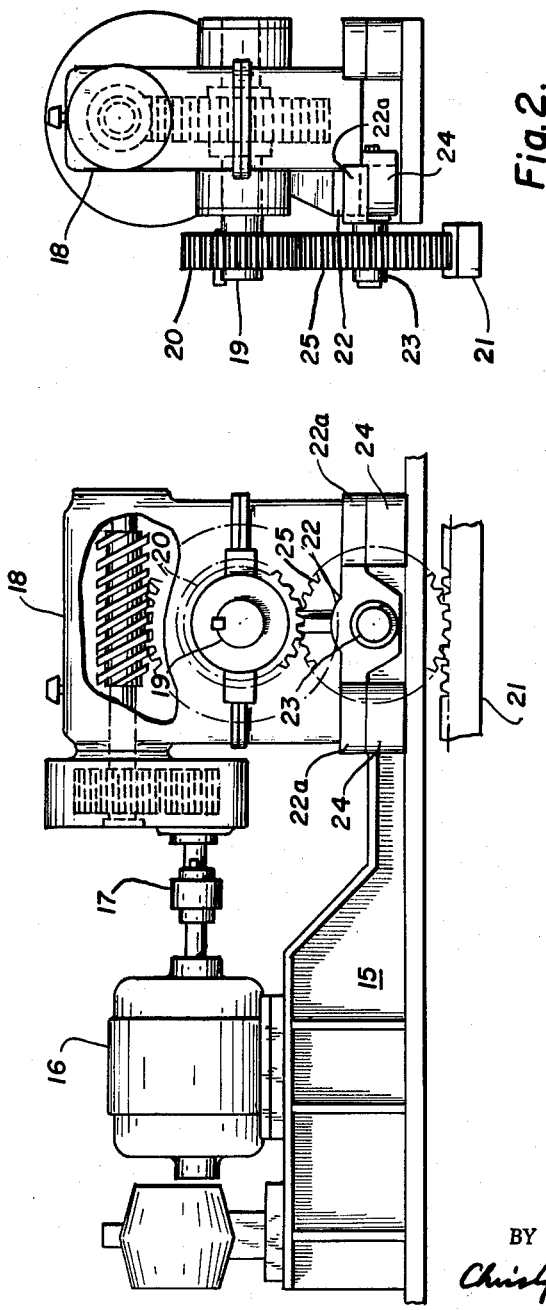
INVENTOR.
Jerome Raleigh Gross
BY
Christy, Parmelee, Strickland
his ATTORNEYS March 23, 1965 J. R. GROSS 3,174,353
SPEED REDUCING GEAR
Filed Feb. 23, 1961 2 Sheets-Sheet 2

INVENTOR.
Jerome Raleigh Gross
BY his ATTORNEYS

3,174,353
SPEED REDUCING GEAR
Jerome Raleigh Gross, Bay Village, Ohio, assignor to Dravo Corporation, Pittsburgh, Pa., a corporation of Pennsylvania
Filed Feb. 23, 1961, Ser. No. 91,178
1 Claim. (Cl. 74—413)

This invention relates to power transmission mechanisms utilizing a speed reducer between a driver and a driven element and is especially applicable to a speed reducer used in a mechanical apparatus in which relative rectilinear motion is effected between the driving mechanism and the part to which the output shaft of the speed reducer is geared.

High ratio speed reducers used industrially have a speed reducing gearing within a closed housing, and the power output shaft is at right angles to the power input or driving shaft. Because of the internal gearing contained in the housing, and in order to secure a compact structure, there is always a minimum dimension between the base of the housing and the center line of the speed reducer output shaft of such magnitude as to require external idler gears in many installations. If the reducer output shaft is directly coupled in end-to-end relation to a shaft to be driven, this minimum dimension is usually unimportant. If, however, the reducer drives against a gear rack, for example, that is to be moved rectilinearly, or relative to which the speed reducer moves, the relative rectilinear motion being crosswise of the axis of the speed reducer output shaft, it is frequently necessary to mount an idler externally of the speed reducer to transmit power from a pinion on the power output shaft of the speed reducer to the gear rack without change in torque or velocity as measured at the pitch radius of the said pinion.

For instance, certain types of bridge cranes are utilized on ships where the crane is moved fore and aft along the ship. There is a fixed gear rack on the ship, and the driving motor is on the crane. There is a speed reducer on the crane driven by the motor, and the power output shaft of the speed reducer is crosswise of the gear rack. An idler gear in such case is mounted alongside the reduction gear of a diameter sufficient to engage both the pinion on said power output shaft and the rack. Since the idler in this instance operates against a fixed rack, the bridge crane is thus caused to move along the rack when the motor is operated. In another instance, a crane or ship cargo handling apparatus may have a boom that is shuttled horizontally. This boom may have a rack fixed to it, and a motor operating through a reducing gear turns a pinion on the power output shaft of the reducing gear. An idler in many instances must be provided between the pinion and the rack which, through this drive, is caused to move one direction or the other to traverse the boom on which it is carried relative to the drive.

The foregoing merely suggest typical applications of a reducing gear operating through an idler against a rack. In such cases there is provided a base or platform on which the motor, the speed reducing gear casing, and the mounting for the idler gear are all secured. The idler must be of a radius such that it will engage both the pinion on the power shaft and the rack. This involves considerable expense and weight; the accurate setting up of parts; and has other disadvantages. Sometimes the idler gear may be driven through a chain from the power output shaft of the speed reducer, but this involves added weight and added parts.

According to the present invention a considerable saving in cost, reduction of weight and other advantages are secured by mounting the idler pinion supporting shaft directly on the reduction gear housing box.

My invention may be more fully understood by reference to the accompanying drawings, in which:

FIG. 1 is a generally schematic side elevation of a simple worn gear reduction gear drive embodying my invention, part of the housing being broken away to show the interior construction;

FIG. 2 is an end view thereof with the pinion and idler shown in place thereon.

Figure 3:
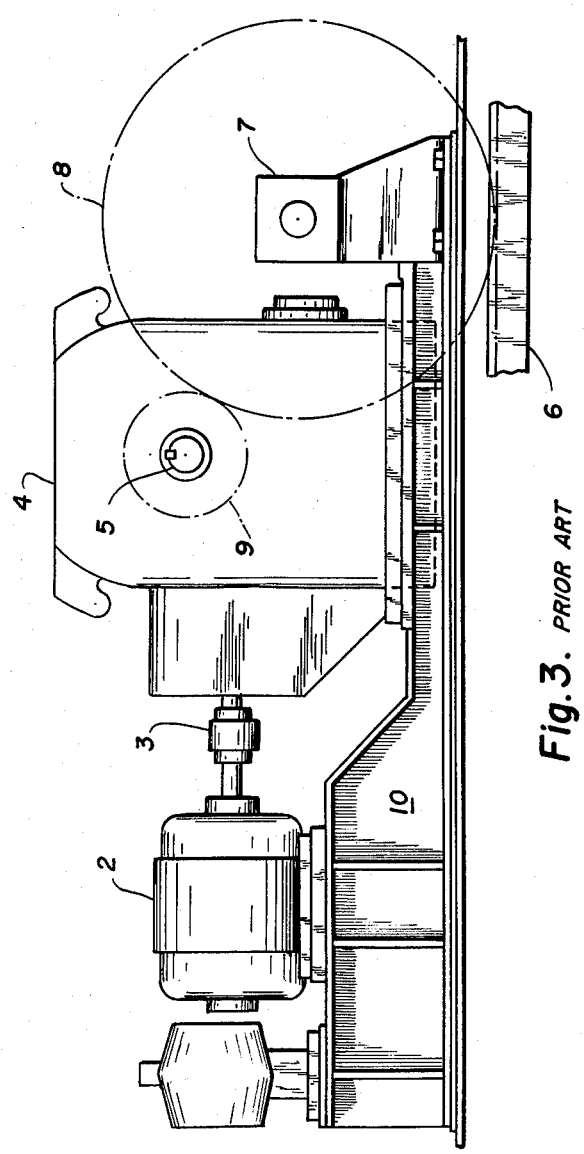
FIG. 3 is a diagrammatic or schematic view similar to FIG. 1 showing a typical arrangement using a similar speed reducer according to standard practice prior to my invention, and by reference thereto my invention may be better understood.

Referring first to FIG. 3 showing a typical conventional form of speed reducer, 2 designates an electric motor having its armature shaft coupled at 3 to the input of a high ratio speed reducer 4. The speed reducing gear train, which generally includes worm or helical gears, forms no part of this invention and may be one of many well-known types. It is here shown as a simple worn gear. The power output shaft is designated 5, and is at right angles to input shaft. A gear rack is indicated at 6, and 7 is the support for an idler gear 8 that meshes with the rack and with a pinion 9 on the power output shaft 5. The motor, the speed reducing gear and the idler gear support 7 are all bolted to a mounting platform 10. When the motor is operated, the pinion 9 exerts a force through the idler 8 against the rack to effect relative movement between the rack 6 and the platform in a direction at right angles to the power output shaft 5.

It will be seen that the idler gear must be of large diameter to engage the pinion 9 and the rack. To enlarge the pinion 9 and omit the idler, or reduce the diameter of the idler, would change the torque or velocity at the pitch radius of the reducer output shaft. A smaller idler may be used, as is sometimes the case, if the pinion 9 is a sprocket and a sprocket chain is used to drive the idler, but this of course requires that there be another sprocket wheel associated with the idler and a more expensive construction is involved.

An embodiment of the present invention is shown in FIGS. 1 and 2 where 15 is a platform or base supporting a driving motor 16 coupled at 17 to a high ratio speed reducing gear indicated at 18. The power output shaft for the speed reducer is designated 19, and it has a pinion 20 thereon keyed thereto. The rack, corresponding to 6 in FIG. 3, is designated 21.

According to the present invention there is mounted directly on the reducing gear housing itself a support 22 for a shaft or stub shaft 23 having its axis parallel to the axis of the power output shaft of the reducing gear. In the specific arrangement here shown, the stub shaft 23 is directly below the power output shaft 19. The support 22 has laterally extending pads 22a bolted to projecting lug portions 24 on the reducing gear housing.

The idler gear 25 is carried by the shaft 23 and meshes with the pinion 20 on the power output shaft of the reducer and also engages the rack 21. By comparing FIGS. 1 and 2 on the one hand with FIG. 3 showing a typical prior arrangement, it will be seen that because of providing a gear housing constructed to carry an external shaft, and by providing the shaft 23 on the outside of the reduction gear housing, a smaller idler may be used; set-up of the machine in the field simplified; weight is reduced, and space is conserved enabling the drive to be more compact. This is of considerable importance in some locations.

In the foregoing description I have referred specifically to the stub shaft being under the power output shaft, but this is not always the case. It may be located at any position on the gear housing about the output shaft, but usually for propelling a bridge crane along a ship it would be in the position shown. In some cases friction wheels may be used as a substitute for spur gears, and my invention contemplates such substitution gears.

While I have shown and described one specific embodiment of my invention, the reduction gear may take various forms and be used in various environments within the contemplation of my invention.

I claim:

A reduction gear mechanism comprising a housing to contain a reducing gear train, a reducing gear train in the housing and with a drive shaft projecting through the housing and a driven shaft projecting through the housing at right angles to the drive shaft, a pinion on the driven shaft a support secured to the exterior of the housing, a stub shaft mounted in said support extending outwardly from the housing parallel with but in spaced relation to the driven shaft, an idler gear on the stub shaft meshing with the pinion and having its periphery extending beyond the reducing gear housing, and a rack with which a portion of hte idler gear projecting beyond the reduction gear housing is directly meshed and between which and the reduction gear housing relative rectilinear movement is to be effected.

References Cited by the Examiner

UNITED STATES PATENTS

| | | | |
|---|---|---|---|
| 280,757 | 7/83 | Myers | 74—325 |
| 2,131,531 | 9/38 | Behrens | 74—606 X |
| 2,392,149 | 1/46 | Hornbostel | 74—689 |
| 2,685,260 | 8/54 | Auger | 105—29 |
| 2,700,345 | 1/55 | Cox | 105—29 |
| 2,783,654 | 3/57 | Carnell | 74—606 X |

FOREIGN PATENTS

| | | |
|---|---|---|
| 205,114 | 2/08 | Germany. |
| 391,543 | 5/33 | Great Britain. |

DON A. WAITE, *Primary Examiner.*